March 5, 1957  J. R. STOVALL, JR., ET AL  2,783,648
APPARATUS FOR DETERMINING DYNAMIC UNBALANCE
Filed June 25, 1951  4 Sheets-Sheet 1
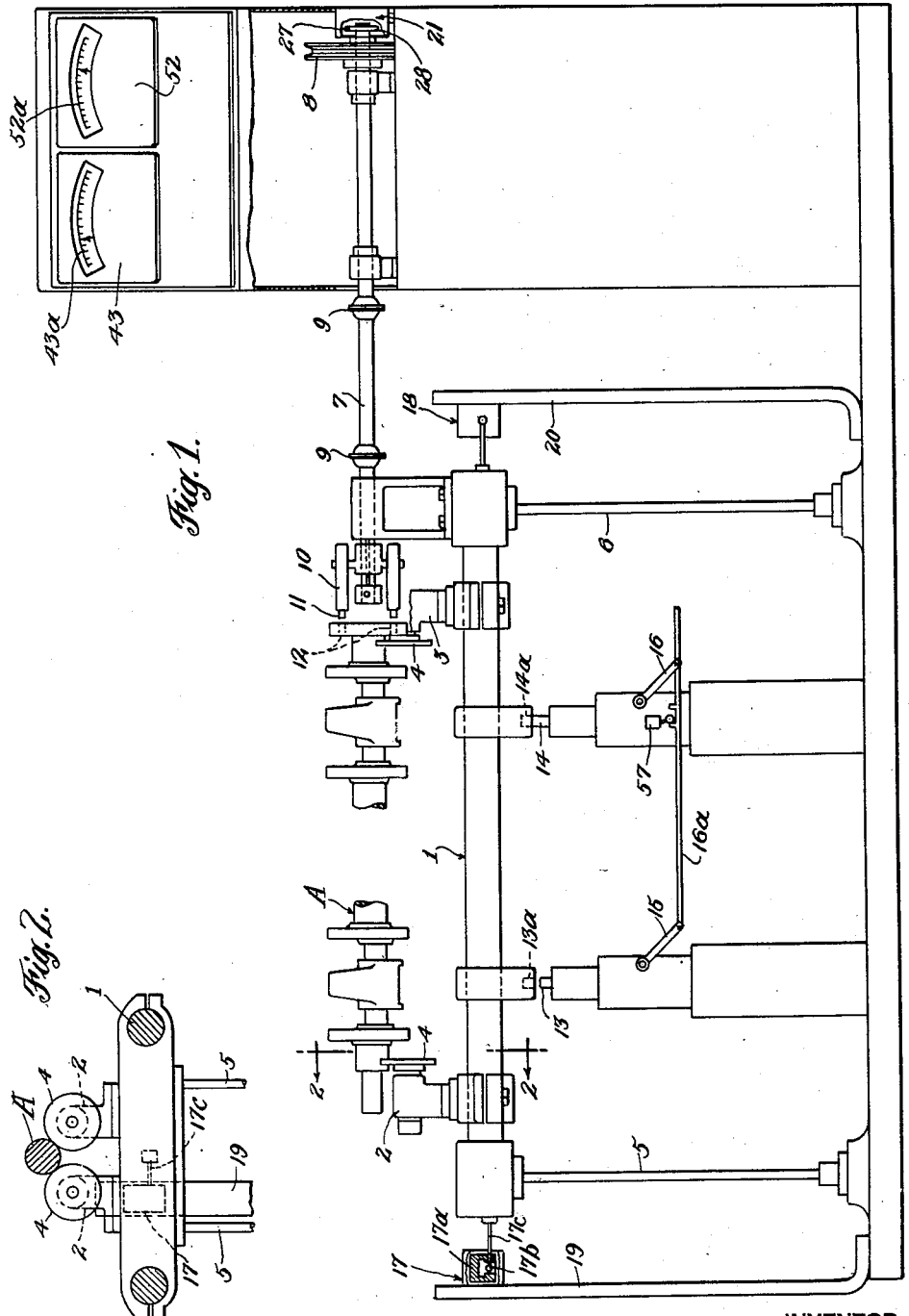

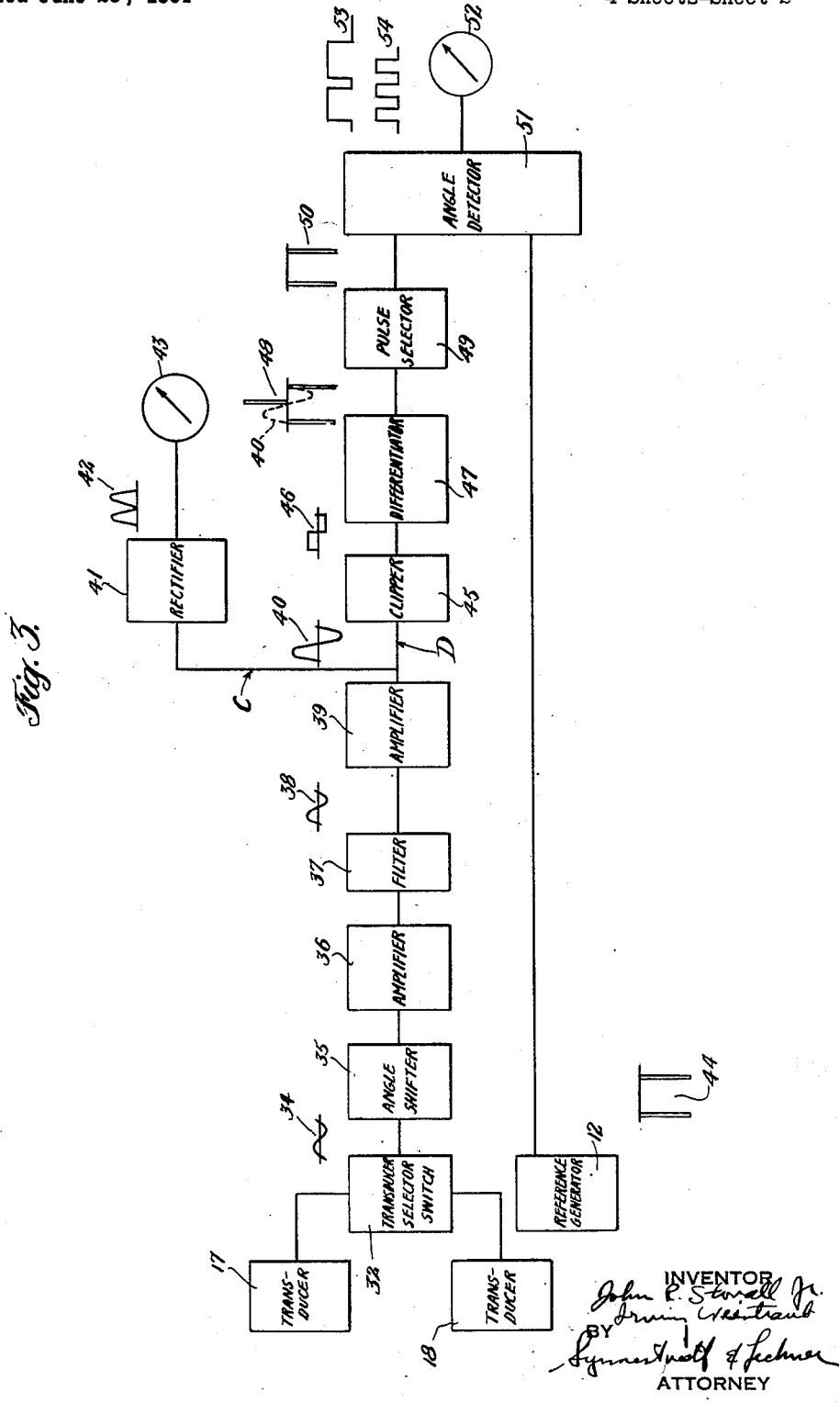

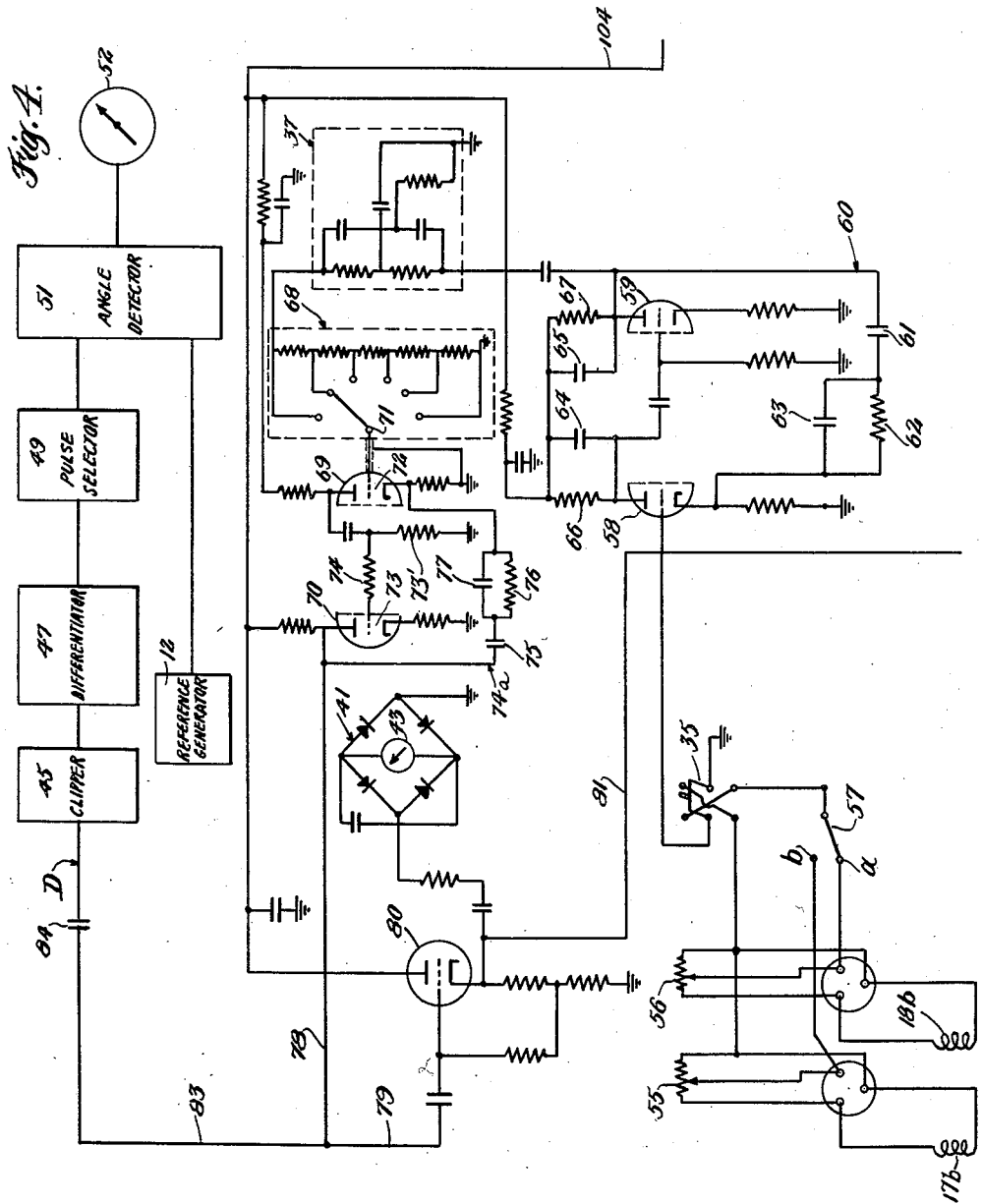

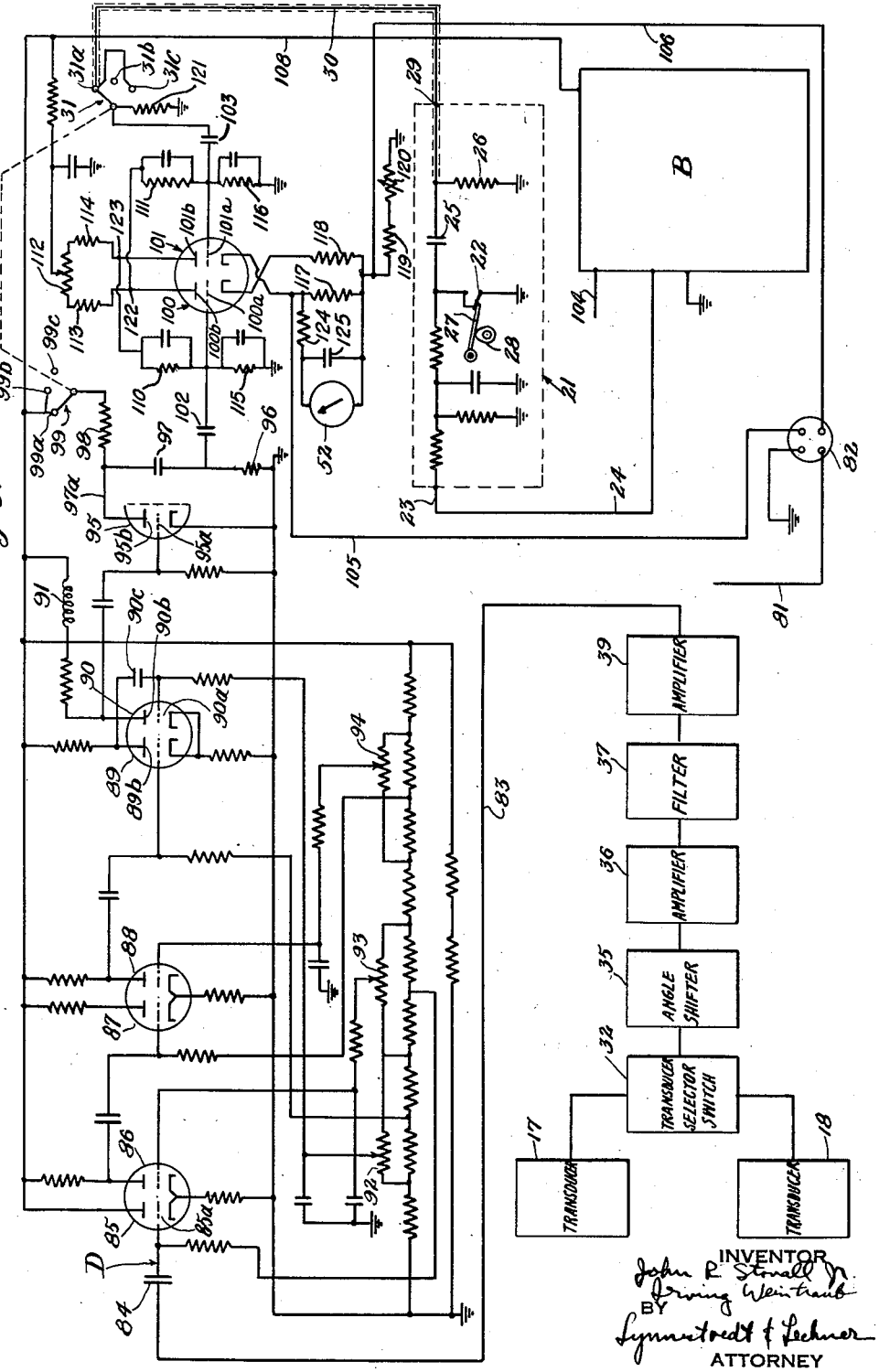

United States Patent Office 2,783,648
Patented Mar. 5, 1957

2,783,648

APPARATUS FOR DETERMINING DYNAMIC UNBALANCE

John R. Stovall, Jr., and Irving Weintraub, Philadelphia, Pa., assignors to Tinius Olsen Testing Machine Company, Willow Grove, Pa., a corporation of Pennsylvania Application June 25, 1951, Serial No. 233,294

6 Claims. (Cl. 73—462)

This invention relates to the determination of dynamic unbalance in rotatable articles and is particularly concerned with the provision of testing mechanism for automatically measuring and directly indicating the magnitude and location of unbalance.

The invention is of special advantage and utility in manufacturing plants, for instance in the manufacture of machinery incorporating rotating parts which require high dynamic stability. The machines of the present invention are particularly adaptable in those instances where precision balancing must be maintained in a manufacturing schedule requiring high rates of production. In this respect the machines of the present invention are especially useful because the measuring time is practically instantaneous and because the operation and accuracy of the machine is substantially independent of the skill of the operator.

In a machine of the general kind to which the invention relates, the article to be tested is rotatably mounted in a support or cradle. The cradle is mounted on elastic supports which confine its movement substantially in a plane containing the axis of rotation of the article to be tested. The cradle being mounted in an elastic support will oscillate due to centrifugal force exerted by the unbalance in the rotating article in said plane in a linear manner and with a displacement proportional to the amount of unbalance.

The present invention contemplates the utilization of the oscillation of the cradle and the rotational speed of the test specimen for the generation of certain voltages or currents and further contemplates the use of these to automatically measure the magnitude and location of unbalance and to directly and visually indicate the same.

For the measurement of the magnitude of unbalance in an article, the invention contemplates means for the generation of a current whose average value is proportional to the displacement of the cradle and circuit means for the automatic measurement and indication of this current. In the measurement of the angular location of unbalance, the invention contemplates the generation of a reference current whose period and time base are related in a known manner to the rotational speed and a rotational position of the piece being tested, and circuit means for measuring and indicating the angular relation between the displacement current and the reference current.

In the measuring cycle the system requires no manipulation and automatically gives a direct reading immediately upon rotation of the piece.

Heretofore various methods for measuring the amount and location of unbalance in a specimen have been employed. For example, one method contemplates the use of an oscilloscope or an oscillograph for visually indicating the desired quantities on a screen. Another well known scheme is the null or balancing system utilizing generators and attenuators manually adjusted to balance generated signals. A third scheme is that of the synchronized commutator or two pole switch. All of these schemes have certain inherent disadvantages. For example, they are not fully automatic, they are time-consuming, they require highly trained operators, and further are subject to inaccuracy as they are largely dependent upon the skill of the operator.

In contrast, the present invention provides a dynamic balancing machine that is completely self-indicating, is independent of the skill of the operator, and reduces the manipulations required by the operator to merely loading the test piece and starting the machine.

Furthermore, the signals produced by the system of the present invention are of a nature to be useable in standard meters and are adaptable for transfer to other automatic machines or systems for the purpose of controlling the operation thereof.

The novelty and utility of the present invention will be readily apparent from the following description and drawings wherein:

Figure 1 is a somewhat diagrammatic view of testing mechanism according to invention.

Figure 2 is a fragmentary transverse sectional view taken through section lines $x$—$x$ of Figure 1.

Figure 3 is a block diagram of the measuring and indicating circuits of the present invention.

Figure 4 is a schematic wiring diagram of the amplitude measuring circuit of the present invention together with a block diagram of other parts.

Figure 5 is a schematic wiring diagram of the phase angle measuring circuit of the present invention together with a block diagram of other parts.

Referring first to Figure 1 an article, for example crank shaft A, is supported on cradle 1. The article is adapted to be rotatably supported by means of members 2 and 3, carrying rotatable idling disks 4—4. The cradle is mounted on elastic supports 5 and 6. The driving mechanism for the article consists of drive shaft 7, carrying pulley 8, which is adapted to be connected with a drive motor (not shown). Included in the driving mechanism are universal joints 9—9, the purpose of which will be explained below. The article A is adapted to be coupled with the drive shaft by means of member 10, which is slidable on and keyed to shaft 7. Member 10 has pins 11 which are adapted to engage in holes 12 on the article.

When the article is rotated centrifugal force exerted by the unbalance will tend to cause the article, hence the cradle, to oscillate in a linear manner and with a displacement proportional to the amount of dynamic unbalance. The cradle 1 being mounted in elastic supports 5 and 6 will oscillate in a sinusoidal manner.

Two correction planes are required for the determination of dynamic unbalance. Although the article and the cradle or support may be allowed to oscillate as a free body around its own mass axis, it is, however, preferable that a fixed point of oscillation be established. For this purpose the cradle is provided with pivots 13 and 14, which may selectively be engaged or disengaged with the holes 13a and 14a in cradle 1 by handles 15 and 16, which are adapted to be moved by member 16a. Pivoting the movement about such points simplifies the arrangement of the testing mechanism because correction in the pivot plane does not effect correction in other planes. When pivot 14 is engaged (as shown) the article will oscillate freely about that pivot and in a plane generally radial of the article.

As mentioned above, the article A is coupled with the driving source through universal joints 9—9. The joints allow the cradle and article to oscillate freely about either of the pivot points with no restraining forces from the driving source.

Shown on Figures 1 and 2 are transducers 17 and 18. In the preferred arrangement the transducer comprises a permanent magnet 17a which is held in a fixed position on member 19; and a displaceable element, for example a coil 17b, which is fixed to cradle 1 by connecting arm 17c. The coil 17b therefore is displaceable in accordance with the movement of the cradle. The arrangement of the transducer 18, which is supported by member 20, is identical with transducer 17.

These transducers are for the purpose of developing electrical power one component of which is varied proportionally to the amount of dynamic unbalance in the article, and at a frequency determined by the rotational speed of the article. The signal thus produced is fed to a measuring and indicating circuit which will later be described.

Although these transducers may take a variety of forms there are certain advantages in using the type described with the particular measuring circuits of the present invention. For example, these transducers are very rugged and sturdy, and have a high degree of stability, the operation being substantially independent of changes in ambient temperature.

Shown on Figure 1 is the reference signal generator 21, which is coupled to shaft 7 and rotated thereby. This generator may take a variety of forms and is for the purpose of generating electrical power one component of which is varied in accordance with the rotational speed of the article and at intervals related to a predetermined rotational position of the article.

There are a number of ways in which to fix a desired rotational position of an article to be tested. On the machine as shown in Figure 1 the holes 12—12 are related in a known manner to a certain position on crank shaft A, and the mechanism in the signal generator for generating the desired signal is arranged in a known manner relative to these holes.

The general arrangement of the generator 21 further is shown on Figure 5. Essentially the generator consists of electrical elements operative in accordance with the position of switch 22. In the operation of the generator direct current is fed to the input terminal 23 from power supply B via conductor 24. When the switch 22 is open, capacitor 25 will charge and when switch 22 is closed, the capacitor will discharge, the discharge loop being through switch 22 and resistor 26. The lever 27 connected to switch 22 opens and closes the switch in accordance with movement of cam 28, which is incorporated in the drive shaft 7, generally as shown on Figure 1. The portion of the cam surface which causes lever 27 to close the switch is synchronized with the known rotational position of the article mentioned above. The voltage developed across resistor 26 by the discharge of capacitor 25 is fed from output terminal 29 via conductor 30 to a switch 31 for use in a circuit hereinafter described.

A reference pulse generating arrangement as above described is particularly advantageous because the means for providing discharge of the capacitor is easily synchronized with the known rotational position of the article.

The system therefore provides a convenient means of generating a signal at a predetermined and known rotational position of the article to be tested. The signal produced is utilized in a circuit for determining the angular location of unbalance. This circuit will subsequently be described in detail.

Shown on Figure 3 is a block diagram illustrating the various circuit elements arranged in accordance with the present invention. Reading from left to right are shown transducers 17 and 18, which have been previously described. The transducers 17 and 18 are connected to selector switch 32 which connects the transducer desired to be used. Shown above the transducer selector switch is a sinusoidal wave 34 which generally represents the signal produced by the transducer. Connected to the transducer selector switch is an angle shifter 35 which is an important feature of the present invention and will be described in more detail hereinafter. Following the angle shifter is shown a first amplifier stage 36 and a filter 37. Above the filter is shown another sinusoidal wave 38 which generally represents the amplified signal. This signal is fed as is shown to a second amplifier stage 39, which further amplifies the signal.

After the second amplification the amplified signal 40 is fed into channels C and D; channel C for indicating the amplitude of the signal and channel D for indicating the location of unbalance with respect to a known position on the article.

In channel C the signal 40 is fed to rectifier 41 where the signal is rectified to give a full wave output 42. The rectifier block also includes a cathode-follower which supplies sufficient power to drive the rectifier. Signal 42 is then fed to meter 43 where the amount of the unbalance is indicated. For purposes of reading the amount of unbalance the scale 43a of meter 43 may be calibrated in a variety of ways, the preferred arrangement having calibrations representing ounces of material.

The principle involved in the determination of the angular position of unbalance is in the measuring of the phase angle (meaning angle of unbalance) between corresponding portions of the two signals having the same frequency. As has been previously described, a reference signal is produced by the reference generator 12 when the rotating article passes a known rotational position. The other signal is produced by the transducer 17 or 18 due to the oscillation of the rotating article. If there is no phase difference between the two signals, the location of unbalance coincides with the predetermined rotational position. Where there is a phase difference between the two signals, this difference then corresponds to the relative angular position of unbalance with respect to the predetermined or known point.

The reference signal produced in generator 12 is shown at 44 as negative polarity pulses having the same period as signal 34. The reference signal 44 is fed as shown in the diagram to angle detector 51.

Referring now again to the phase channel D, the amplified signal 40 is first clipped in clipper 45, that is to say both the positive and negative portions of the wave are clipped to an arbitrary level, the effect of which is to generate the square wave shown at 46. The square wave is then fed to a differentiator circuit 47, which develops a signal 48. Signal 48 is a train of pulses which as shown appear at the cross-over points of signal 40. (Signal 40 is drawn in dotted lines on 48 to illustrate this.) Signal 48 is then fed to a pulse selector 49, which substantially eliminates the positive pulse, giving a wave pattern shown at 50. The signal 50 is then fed to the angle detector 51.

The angle detector is essentially a trigger circuit which is adapted to develop a signal proportional to the time interval between the above mentioned signals, the time difference corresponding to the position of angular unbalance. The signal produced by the detector 51 is fed to meter 52 which indicates the angle of unbalance. The scale 52a of meter 52 is calibrated in degrees. Signals 53 and 54 respectively represent large and small angular positions of unbalance with respect to the predetermined or known point.

The circuit for measuring the amount of dynamic unbalance is shown in detail on Figure 4. The circuit is a special vacuum tube amplifier circuit which is supplied with a signal from either coil 17b of transducer 17, or coil 18b of transducer 18. The B-plus voltage for the various tubes in the circuit is supplied from the power supply B via conductor 104. Connected with the transducer coils are calibrating resistors 55 and 56. As has been mentioned heretofore, dynamic unbalance is desirably determined in two correction or pivot planes. Transducer 17 is used as a signal pickup when pivot 14 is engaged with the cradle and transducer 18 is used as a signal pickup when pivot 13 is engaged. The particular transducer to be used is selected by means of switch 57, which is actuated by member 16a as is shown on Figure 1. When pivot 13 is in use the switch is closed to point a which connects transducer coil 18b to the measuring circuit. When pivot 14 is in use the switch is closed to position b and connects coil 17b to the measuring circuit.

The output of the particular transducer in use is fed to the angle shifter 35 which is as shown a double-pole double-throw switch. This switch is of particular importance and utility in the arrangement, the purpose of which will be subsequently described. From the switch the signal is fed to a first amplifier stage (36) comprising a double triode 58 and 59. The amplifier stage has a large amount of negative feed-back which makes the amplifier relatively stable in gain and renders it relatively free from vacuum tube aging effects. The feed-back loop is shown generally by numeral 60 and includes capacitor 61 and resistor 62, which interconnect the plate of tube 59 and the cathode of tube 58. Of considerable importance in the feed-back circuit is the provision for a high frequency filter, comprising capacitor 63 connected across resistor 62. The purpose of this filter is to eliminate the effects of any high frequency oscillations that may be present in the circuit due to spurious vibrations imparted either to the fixed or movable element of the transducer by vibration of the machine. Another important feature of the amplifier stage is the provision of high frequency filters 64 and 65 across plate load resistors 66 and 67. These filters serve the same purpose as described just above.

The output from the amplifier stage is then fed to a parallel-T filter generally shown at 37, which serves to eliminate any 60 cycle hum that might be developed in the first amplifier stage. From the parallel-T filter the signal is fed to an attenuator generally shown at 68. The purpose of the attenuator is to change the magnitude of the signal from the amplifier in order to obtain full scale deflection on the indicator meter 43.

The signal from the attenuator is fed to a second resistance coupled amplifier stage (39) comprising double triode 69 and 70. The signal is fed from the attenuator tap 71 to grid 72 of tube 69, voltage being developed by the grid load resistor 73'. The output of this tube in turn is fed to grid 73 of tube 70. An important feature in the coupling of these tubes is the provision of resistor 74 which is connected in series with the plate of tube 69 and the grid of tube 70. The purpose of the resistor is to attenuate high level transients, for example an abnormal signal produced if the movable element of a transducer were inadvertently moved as by the hand of the operator.

The second amplifier stage also includes a feed-back loop generally shown by reference numeral 74a and comprises capacitor 75 and resistor 76 interconnecting the plate of tube 70 and the cathode of tube 69. Provision is made for a high frequency filter 77 which serves a similar purpose as described for filter 63 in the first amplifier stage.

The output of the amplifier stage is then fed via conductors 78 and 79 to cathode-follower 80, which is essentially a power amplifier supplying current in accordance with the received signal sufficient to drive the indicator meter 43. The output of the cathode-follower is rectified by full wave rectifier 41 and then fed to the meter 43. The provision for the cathode-follower after the amplifier stage is of considerable importance since the output power level is then great enough to allow the use of a standard meter.

As was described in the preceding remarks regarding the block diagram, the output of the amplifier stage (39) in addition to being connected to the cathode-follower 80 is also connected to the phase channel D where it is used in the determination of the angular location of unbalance. This latter connection is shown on Figure 4 wherein the output of tube 70 is connected with the phase channel via conductors 78 and 83.

The circuit for measuring and indicating the angular location of unbalance is shown in detail in Figure 5. As has been mentioned heretofore, this determination is made by comparing the phase difference between the signal developed by the transducer (17 or 18) and the signal developed by the reference generator 21. The angle measuring circuit will be described in detail in the paragraphs following.

As is illustrated on Figure 5, a signal from either transducer 17 or 18 is fed through the various circuit elements included in the blocks 32 to 39 from whence it is fed to the phase channel D via conductor 83 and coupling capacitor 84.

The sinusoidal signal is fed to the grid 85a of tube 85. Tubes 85—86, 87—88 and 89—90 constitute three pairs of cathode coupled clippers which serve to clip the positive and negative portions of the sine wave and to thereby generate a square wave. The bias voltages of the tubes are chosen so that positive clipping occurs for example in tube 86 and negative clipping in tube 85. The clipping action in tubes 87—88 and 89—90 takes place in a similar manner. The bias voltages are such that the clipping is symmetrical. Tubes 89—90 are made regenerative by the coupling condenser 90c, coupling the plate 89b of tube 89 to grid 90a of tube 90 and serving to increase the sharpness of the square wave front.

To permit adjustment of the clipping action the bias voltages may be adjusted on the several tubes by poteniometers 92, 93 and 94.

The square wave signal is fed from plate 90b of tube 90 to the grid 95a of tube 95. Resistor 96 and capacitor 97 form a differentiation circuit, which is connected both to the plate 95b of tube 95 and to the B-plus source. The plate connection being made by conductor 97a. The B-plus connection being made via resistor 98 to switch 99 which receives the positive potential from the power supply B by way of conductor 108. The negative half of the square wave cuts off the operation of tube 95, which permits the capacitor 97 to change to a B-plus potential through resistor 98. The value of the resistor 98 is made quite high so that the magnitude of the charging current is relatively small. On the positive half of the square wave tube 95 conducts heavily the effect of which is to short circuit the capacitor 97 and resistor 96, which allows the capacitor 97 to discharge via resistor 96 and tube 95. The values of resistors 98 and 96 and capacitor 97 are chosen so that the ratio of discharge to charge is considerably greater than unity, in this case the ratio being approximately 33 to 1.

The operation of the above described tube and differentiation circuit is to affect a pulse selection, that is to say, to develop across resistor 96, a train of negative pulses which are approximately 33 times as large as the positive pulses. The negative pulse occurs once for each cycle of the sine or square wave and at the positive crossing of the time axis. The signal produced across resistor 96 is fed to a flip-flop or trigger circuit.

The trigger circuit includes tubes 100 and 101 which comprise essentially a two stage direct couple amplifier. The output from the plate 101b of tube 101 is connected via resistor 110 to the grid 100a of tube 100. The output from the plate 100b of tube 100 is coupled via resistor 111 to the grid 101a of tube 101. The circuit has essentially two conditions. In one condition tube 100 conducts a large current, while the tube 101 is cut off; in the other condition tube 101 conducts heavily while tube 100 is cut off.

Plate voltage for the tubes 100 and 101 is supplied through the variable resistor 112 and the plate load resistors 113 and 114. The grids 100a and 101a of the tubes 100 and 101 are also adapted to receive B-plus bias respectively through the potential dividers comprising resistors 110—115 and 111—116. The potentials of the respective cathodes are maintained through the network comprising resistors 117, 118, 119 and variable resistor 120. Under static conditions, so to speak, the values of the above-mentioned resistors are selected such that each plate has approximately the same positive potential and each grid has the same positive potential, the latter being substantially close to or less than cut-off. The capacitors connected in parallel with resistors 110, 115, 111 and 116 are for the purpose of suppressing parasitic oscillations.

The negative pulses or control signals developed across resistor 96 appear across the grid resistor 115 via a coupling capacitor 102 and hence at the grid 100a of tube 100. The negative pulses or control signals generated in the reference signal circuit are fed via conductor 30 and switch 31 through resistor 121 and appear across the grid resistor 116 via coupling capacitor 103 and hence at the grid 101a of tube 101. The signal from resistor 96 turns tube 100 off and at the same time turning on tube 101; the reference pulse in turn turns tube 101 off and tube 100 on. The manner in which this is accomplished is explained following. If tube 100 is conducting, the positive potential at point 122 is lowered such that the grid 101a is biased to less than cut-off and the tube 101 is non-conducting. Now, if a negative pulse from resistor 96 appears at the grid 100a, the tube will cut off. Thus, the positive potential at point 122 rises, which positively biases the grid 101a and causes tube 101 to conduct. The conduction of current lowers the potential at point 123; hence, the potential on grid 100a becomes less than cut-off and the tube 100 is permanently cut off. Now, then, suppose a negative pulse from the reference generator appears at the grid 101a, the tube 101 will be cut off. The effect of this is to increase the positive potential at point 123 and hence, positively bias the grid 100a and start tube 100 conducting. The potential at point 122 is lowered and the tube 101 is biased to be non-conducting until another negative pulse from the resistor 96 appears at the grid 100a to turn tube 100 off and turn tube 101 on. The angle meter 52 in the cathode to ground circuit of tube 101 indicates the current being carried by that tube. The meter is actuated by the voltage appearing across resistor 117. The resistor 124 and capacitor 125 provide a filtering arrangement for the meter.

If the two signals applied to their respective grids occur at the same instant of time the location of angular unbalance is in a plane containing the known or fixed rotational position of the article. Where there is a time difference in the appearance of these signals on their respective grids, tube 101 will conduct current until the signal from the reference generator appears on grid 101a thereof. The length of time which tube 101 is conducting represents or is indicative of the angular location of unbalance with respect to the known point.

When the two signals occur on their respective grids at the same instant of time, i. e., when the location of angular unbalance is at or close to zero or 360 degrees, the circuit tends to become unstable, resulting in oscillation of the angle meter pointer. To compensate for this condition, a highly novel, useful and convenient correction means has been provided. This correction means takes the form of double-pole, double-throw switch 35, which has been briefly mentioned heretofore. Thus when this particular situation occurs switch 35 may be turned from one pole to the other, the effect of which is to shift the time base of the sinusoidal signal from the transducer 180°. This shift has no effect on the amount meter, since the amount circuit is concerned only with a measurement of signal amplitude. The changing of the switch does, however, have a desired effect on the phase circuit. Clearly, if the sinusoidal wave is changed in time 180° the same phenomena will take place in the generated square wave and also will shift the time base of the train of pulses developed across resistor 96. In so far as the operation of the trigger circuit is concerned, the effect also is merely to change the time base 180°. This change of course will be reflected in the meter reading, but since the change is a known quantity it may be easily compensated for as the operator reads the meter.

Thus the measuring system as thus described gives a novel and highly useful indicator for use in determining the magnitude of dynamic unbalance. The system is highly accurate, very stable and convenient to use because it is completely automatic and is direct reading. The system indicates instantly when the specimen rotation begins and requires a minimum of manipulation on the part of the operator. The signals produced being high level are not only useable in standard meters, but may be transferred to other automatic machines or systems, for example the amplitude signal by way of connection 81 to plug 82 and the angle signal by way of connections 105 and 106 to plug 82.

The power supply B for the circuits of the present invention may be any of several well known types and therefore is not described in detail, as it forms no part of the present invention per se. The B-plus voltage from the power supply to the phase circuit is fed via conductor 108. The B-plus voltage for the amplitude circuit is fed via conductor 104. Conductor 24 supplies B-plus voltage to the pulse circuit.

The operation of the system is relatively simple, the operator merely loads the article, for example the crank shaft A, on the cradle and connects the article with the driving source by means of the member 10. The amount of unbalance in each of the two correction planes is determined successively, the operator engaging the left hand pivot for the readings in the right hand correction plane, and vice versa. As mentioned before, the actuation of the pivot selects the proper transducer to be used. The operater then closes the switch for the power drive motor (not shown) and then sets switches 99 and 31 to the contact points 99a and 31a as is shown on Figure 5. These switches are gang operated. When the system is in operation as thus described, the operator may immediately determine the magnitude of unbalance and the location of unbalance by reading meters 43 and 52.

The other contacts on switches 99 and 31, namely contacts 99b—99c and 31b—31c, are used in calibrating meter 52, in accordance with a signal received from either phase channel D or generator 21.

We claim:

1. For use in determining dynamic unbalance in an article, a machine having a support for rotatably mounting the article and means to rotate the article, said support being elastically restrained for movement whereby rotation of said article causes said support to be displaced sinusoidally with an amplitude of displacement proportional to the magnitude of unbalance, mechanism for determining the magnitude of unbalance including a transducer having an element movable in accordance with the movement of said support and delivering a sinusoidally varying signal, a first amplifier stage for said signal including a feedback circuit having a high frequency filter connected therewith, a plate load impedance having a high frequency filter connected therewith, a second amplifier adapted to receive a signal from the first amplifier and having a feedback circuit including a high frequency filter, a band elimination filter connected between the first and second amplifiers, and mechanism to receive and measure the signal from the second amplifier including a cathode-follower, a rectifier connected with said cathode-follower to rectify the signal therefrom and a meter connected with the rectifier to measure the rectifier output.

2. For use in determining dynamic unbalance in an article, a machine having a support for rotatively mounting the article and means for rotating said article, said support being elastically restrained for movement whereby rotation of the article causes said support to be displaced sinusoidally with an amplitude of displacement proportional to the magnitude of unbalance: mechanism for determining the magnitude of unbalance including a transducer having an element movable in accordance with the movement of said support and delivering a sinusoidally varying signal; a first amplifier stage for amplifying said signal comprising first and second electron tubes each having grid, plate, and cathode electrodes, a feedback circuit interconnecting the cathode of the first tube and the plate of the second tube including a coupling impedance and a high frequency filter; a second amplifier stage connected to receive a signal from the first amplifier comprising third and fourth electron tubes having grid, plate and cathode electrodes for amplification of said signal, a resistor series connecting the plate of the third tube and the grid of the fourth tube whereby to attenuate spurious high level transients developed by said transducer, a feed-back circuit interconnecting the plate of the fourth tube and the cathode of the third tube including a coupling impedance and a high frequency filter; and circuit means receiving a signal from said second amplifier stage including mechanism to indicate said signal.

3. For use in determining dynamic unbalance in an article, a machine having a support for rotatably mounting the article and means for rotating the article, said support being elastically restrained for movement whereby rotation of said article causes said support to be displaced sinusoidally in accordance with the amount of unbalance, apparatus for determining the magnitude and angular position of dynamic unbalance comprising: means having an operative connection with said support to develop a sinusoidal signal in accordance with the movement of the support; means responsive to said sinusoidal signal to measure and indicate the magnitude of the signal whereby to indicate magnitude of unbalance; means responsive to said sinusoidal signal to develop a second signal characterized by a plurality of pulses, said pulses occurring in time at selected crossover points of the sinusoidal signal; means having an operative connection with said article to develop a third signal characterized by a plurality of pulses occurring in time at a selected point of the rotational position of said article; mechanism developing a fourth signal, including means operative in accordance with the first signal to start the operation of the mechanism and means operative in accordance with the third signal to stop the operation of the mechanism; and mechanism to measure and indicate the magnitude of said fourth signal whereby to indicate angular position of unbalance.

4. A construction in accordance with claim 3 further including mechanism for shifting the time base of said sinusoidal signal.

5. For use in determining dynamic unbalance in an article, a machine having a support for rotatably mounting the article and means to rotate said article, said support being elastically restrained for movement whereby rotation of the article causes the support to be displaced in accordance with the magnitude of unbalance of the article, apparatus for determining the angular position of dynamic unbalance, including a transducer adapted to deliver a current and having an element connected to and movable in accordance with the movement of said support, a circuit connected with said transducer and delivering a first unidirectional periodic current of the same frequency as said transducer current, a generator connected with said rotating means and developing a second unidirectional periodic current of the same frequency as said transducer current and whose time base is related in a known manner to a predetermined axial plane through the article, said currents having the same polarity, mechanism connected to receive said currents for measuring the phase angle relationship therebetween whereby to determine the angular position of unbalance including means responsive to the first current to start the operation of the mechanism and means responsive to the second current to stop the operation of the mechanism, and means connected between said transducer and said circuit for changing the time base of said transducer current a predetermined amount.

6. For use in determining unbalance in an article, a machine having a support for rotatably mounting the article and means for rotating the article, said support being elastically restrained for movement whereby rotation of the article causes the support to be displaced in accordance with the amount of unbalance, apparatus for determining the amount and angular position of unbalance comprising: means operatively connected with said support to develop a first signal in accordance with the movement of the support; means responsive to said first signal to measure the magnitude of the signal for indicating amount of unbalance; means responsive to said first signal to develop a first control signal, the phase of which is related in a known manner to the time base of said first signal; means having an operative connection with said article to develop a second control signal, the phase of which is related in a known manner to a predetermined point of the rotational position of said article; mechanism developing another signal including means operative in accordance with one of said control signals to start the operation of the mechanism and means operative in accordance with the other of said control signals to stop the operation of the mechanism; and means to measure the magnitude of said other signal for indicating angular position of unbalance.

References Cited in the file of this patent

UNITED STATES PATENTS

| | | |
|---|---|---|
| 2,108,014 | Jones | Feb. 8, 1938 |
| 2,131,602 | Thearle | Sept. 27, 1938 |
| 2,167,488 | Ohlson | July 25, 1939 |
| 2,243,379 | Johnson | May 27, 1941 |
| 2,310,559 | Walker | Feb. 6, 1943 |
| 2,340,714 | Traver et al. | Feb. 1, 1944 |
| 2,370,692 | Shepherd | Mar. 6, 1945 |
| 2,383,405 | Merrill et al. | Aug. 21, 1945 |
| 2,394,411 | Tolman | Feb. 5, 1946 |
| 2,412,111 | Wilson | Dec. 3, 1946 |
| 2,473,542 | Philpott | June 21, 1949 |
| 2,616,289 | Kleckner | Nov. 4, 1952 |
| 2,651,937 | Martin et al. | Sept. 15, 1953 |

FOREIGN PATENTS

| | | |
|---|---|---|
| 632,666 | Great Britain | Nov. 28, 1949 |